United States Patent [19]
Ivester

[11] 3,994,002
[45] Nov. 23, 1976

[54] SELF-DEVELOPING CAMERA WITH FILM UNIT DEFLECTING STRUCTURE

[75] Inventor: Andrew S. Ivester, Charlestown, Mass.

[73] Assignee: Polaroid Corporation, Cambridge, Mass.

[22] Filed: Mar. 3, 1975

[21] Appl. No.: 554,780

[52] U.S. Cl. .................................. 354/86; 354/288
[51] Int. Cl.[2] .................... G03B 17/00; G03B 17/52
[58] Field of Search .................. 354/83, 84, 85, 86, 354/174, 202, 212, 275, 276, 277, 281, 282, 283, 288, 301, 303, 304, 305, 315, 339, 340

[56] References Cited
UNITED STATES PATENTS 3,757,657   9/1973   Eloranta et al. ...................... 354/86
3,810,211   5/1974   Wareham et al. ..................... 354/86

*Primary Examiner*—Joseph F. Peters, Jr.
*Attorney, Agent, or Firm*—John S. Vale

[57] ABSTRACT

A self-developing camera having a housing which is formed in part by a molded plastic housing section. The housing section includes, integrally molded therewith, a film exit slot, a camming member for deflecting a film unit towards the exit slot, as it emerges from a pair of pressure-applying members, to influence the distribution of fluid processing composition being spread within the film unit, and positioning structure cooperating with a mounting bracket for the pressure-applying members for accurately positioning the film exit slot and camming member with respect to the pressure-applying members.

4 Claims, 8 Drawing Figures

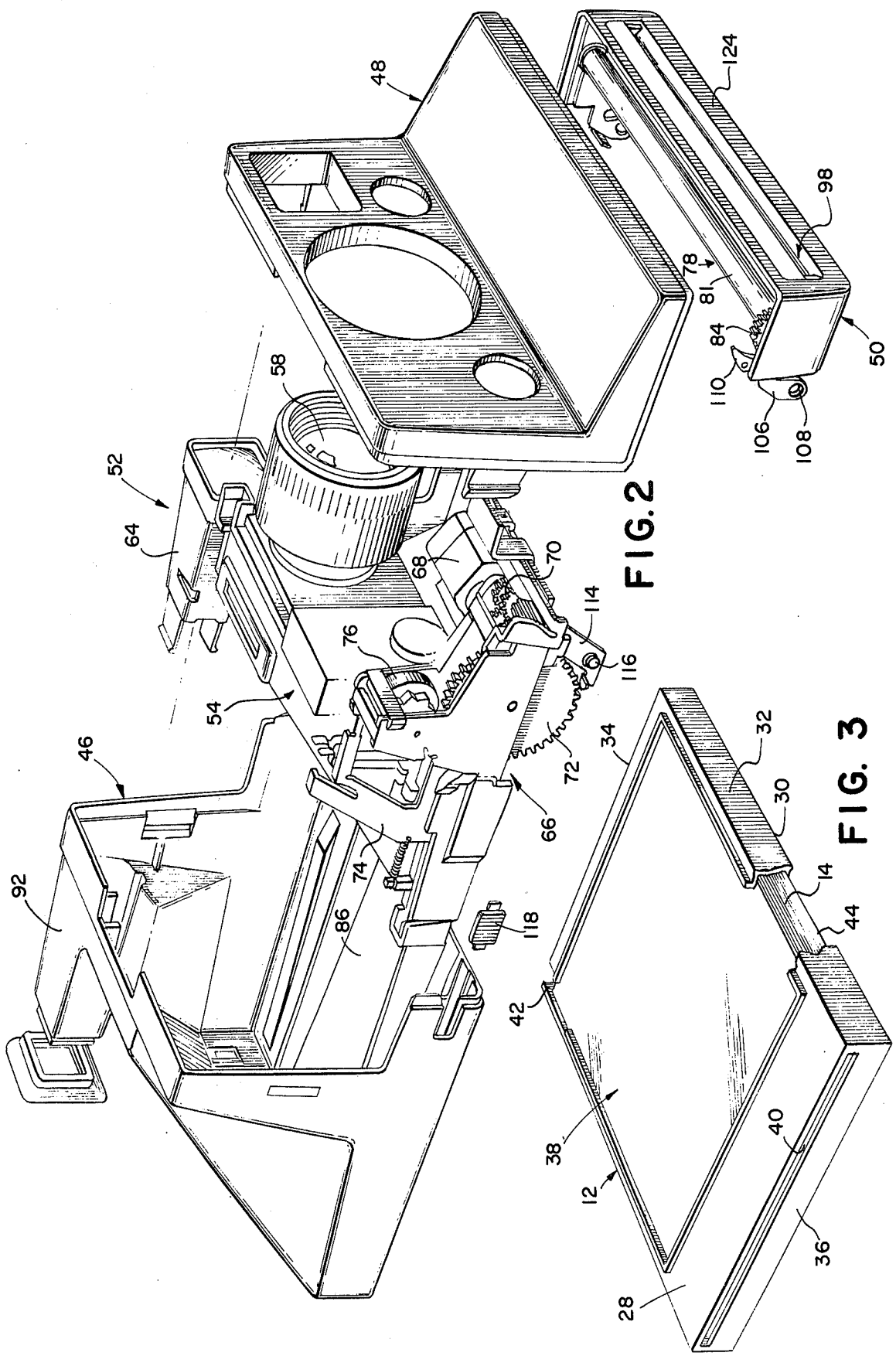

SELF-DEVELOPING CAMERA WITH FILM UNIT DEFLECTING STRUCTURE

BACKGROUND OF THE INVENTION

1. Field of the Invention

The present invention relates to the field of photography and, more specifically, to self-developig cameras having structuure for influencing the distribution of processing composition within a self-developing film unit.

2. Description of the Prior Art

An important step in the processing of a self-developing film unit is the distributing of the fluid processing composition between a predetermined pair of adjacent layers of the film unit, subsequent to exposure, to initiate a development and diffusion transfer process. In order to optimize that process, the fluid must be uniformly distributed over the entire photoexposed area of the film unit.

The present invention relates to controlling the distribution of a processing fluid within an integral or "nonpeel apart" self-developing film unit, representative examples of which are disclosed in U.S. Pat. No. 3,415,644 and 3,594,165.

Basically, these integral film units are multilayer structures having a rupturable container, holding a fluid process composition, at a leading end thereof and a trap for collecting excess fluid at the trailing end. The multilayer structure includes a pair of outer support sheets, at least one being transparent, and a plurality of layers including photosensitive and image receiving layers sandwiched between the outer support sheets which are bound together along lateral edges thereof.

Subsequent to exposure of the photosensitive layer or layers through the outer transparent sheet, the film unit is advance, leading end first, between a pair of pressure applying member for applying a compressive pressure progressively along the length of the film unit thereby rupturing the container, discharging the fluid between a predetermined pair of adjacent layers and distributing the fluid.

Because the layers are bound together along the lateral edges thereof, there is more resistance to fluid flow adjacent these edges than in the center portion of the film unit. Consequently, the discharged mass of fluid tends to advance rearwardly along a tongue-shaped wavefront with a greater concentration of fluid in the center than out at the lateral edges.

In order to compensate for the initial uneven distribution of fluid, it has been found to be advantageous to selectively apply a second compressive pressure to the central portion of the film unit in the path of the rearwardly advancing wavefront. The compressive pressure forces part of the fluid away from center and toward the lateral edges.

U.S. Pat. No. 3,779,770 discloses a film container having integrally formed distribution control surfaces or projections thereon for selectively applying the second compressive pressure to the film unit as it is advanced through a film withdrawal slot in the container to the pressure applying members. Also, reference may be had to U.S. Pat. NO. 3,820,137 which disclose a self-developing camera having structure for engaging and deflecting a thin wall portion of the film container having the distribution members formed therewith for positively urging the control members into engagement with the center portion of a film unit being advanced through the film withdrawal slot.

The integral self-developing film units generally have an inherent stiffness and as a film unit progressively advances from the exit side of the pressure-applying members, in cantilever fashion, it tends to follow a natural and substantially planar path of travel which is defined by the inherent stiffness. It has been discovered that by deflecting the film unit from the natural path of travel, thereby inducing a gentle and large radius bend in the film unit on the exit side of the pressure-applying member, that the uniformity of distribution of fluid within the film unit is significantly and beneficially influenced.

While it is well estabaished that the uniformity of fluid distribution is enhanced by inducing a bend in the film unit as it emerges from the pressure-applying members, the mechanisms which produce the beneficial effect are not well defined at the present time.

A self-developing camera having structure for inducing a bend in the film unit as it emerges from the pressure-applying members is disclosed in U.S. Pat. No. 3,810,211 issued to R. R. Wareham on May 7, 1974. The camera is of the compact, folding, single lens reflex type and includes a housing section which extends forwardly of a pair of pressure-applying members. A combination film bending or deflecting plate and light shielding member is mounted near the forward end of the housing section adjacent a film exit slot therein that is out of alignment with the natural or normal path of travel of the film unit. The plate is mounted for movement between a folded position and an extended position wherein it is disposed in the emerging path of travel for deflecting the emerging film unit, to induce the beneficial bend or curvature, and guiding it to the film exit slot. The disclosed housing section is characterized by its conventional construction using a plurality of piece parts that must be sequentially assembled and adjusted to define the film exit slot and mount the deflecting plate in predetermined relationship with respect to the pressure applying members and exit slot.

SUMMARY OF THE INVENTION

The present invention provides a self-developing camera having improved structure thereon for enhancing the uniformity of the distribution of a processing fluid within a self-developing film unit by inducing a gentle bend having a large radius of curvature in that portion of the film unit emerging from the pressure applying members.

More specifically, the camera is provided with a molded plastic housing section having integrally molded therewith; a film exit slot that is displaced from the normal emerging path of travel of the film unit; a camming member for deflecting the film unit to induce the bend and for guiding the film to the displaced film exit slot; and integrally molded positioning structure which cooperates with a bracket mounting the pressure-applying members for accurately positioning the housing section, and thereby the integrally molded exit slot and camming member, with respect to the film exit side of the pressure-applying members.

Because the housing section is molded in one piece and it includes integrally formed positioning structure, significant manufacturing cost reductions may be realized over the more conventional structure disclosed in the aforementioned U.S. Pat. No. 3,810,211.

Copending applications, Ser. Nos. 466,371 and 466,414 filed on May 2, 1974 disclose a self-developing camera having an extensible and retractable light shield mounted in alignment with the film exit slot. The shield is normally retracted and is extended outwardly from the exit slot to shield portion of the film unit that extends outside the camera housing before the trailing end of the film unit has passed between the pressure applying members. The shield is preferably a self-retracting coil of opaque resilient material. In a preferred embodiment of the present invention, the molded plastic housing also includes an integrally molded member that serves as a stop to locate the coil in its retracted position and cooperates with the retracted coil to form a light shield for the film exit slot.

Therefore it is a primary object of the present invention to provide a self-developing camera having housing that is formed in part by a low cost housing section of molded plastic construction and having integrally molded therewith a film exit slot, a film deflecting member for deflecting the film unit and guiding toward the slot, and positioning structure for cooperating with another component of the camera for accurately positioning the molded plastic housing section with respect to a pair of pressure-applying members.

It is another object of the invention to provide a self-developing camera having such a molded plastic housing section which further includes an integrally molded member for cooperating with an extensible and retractable light shield aligned with the film exit slot for accurately locating the shield in its retracted position and forming a light seal for the film exit slot.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein:

FIG. 2 is a perspective view, shown in exploded fashion, of the modular assemblies and components forming the camera shown in FIG. 1;

FIG. 3 is a perspective view, partly in section, of a film container, holding a plurality of self-developing film units therein, that is adapted to be located at an operative position in the base of the camera shown in FIG. 1;

DESCRIPTION OF THE PREFERRED EMBODIMENT

Figure 1:
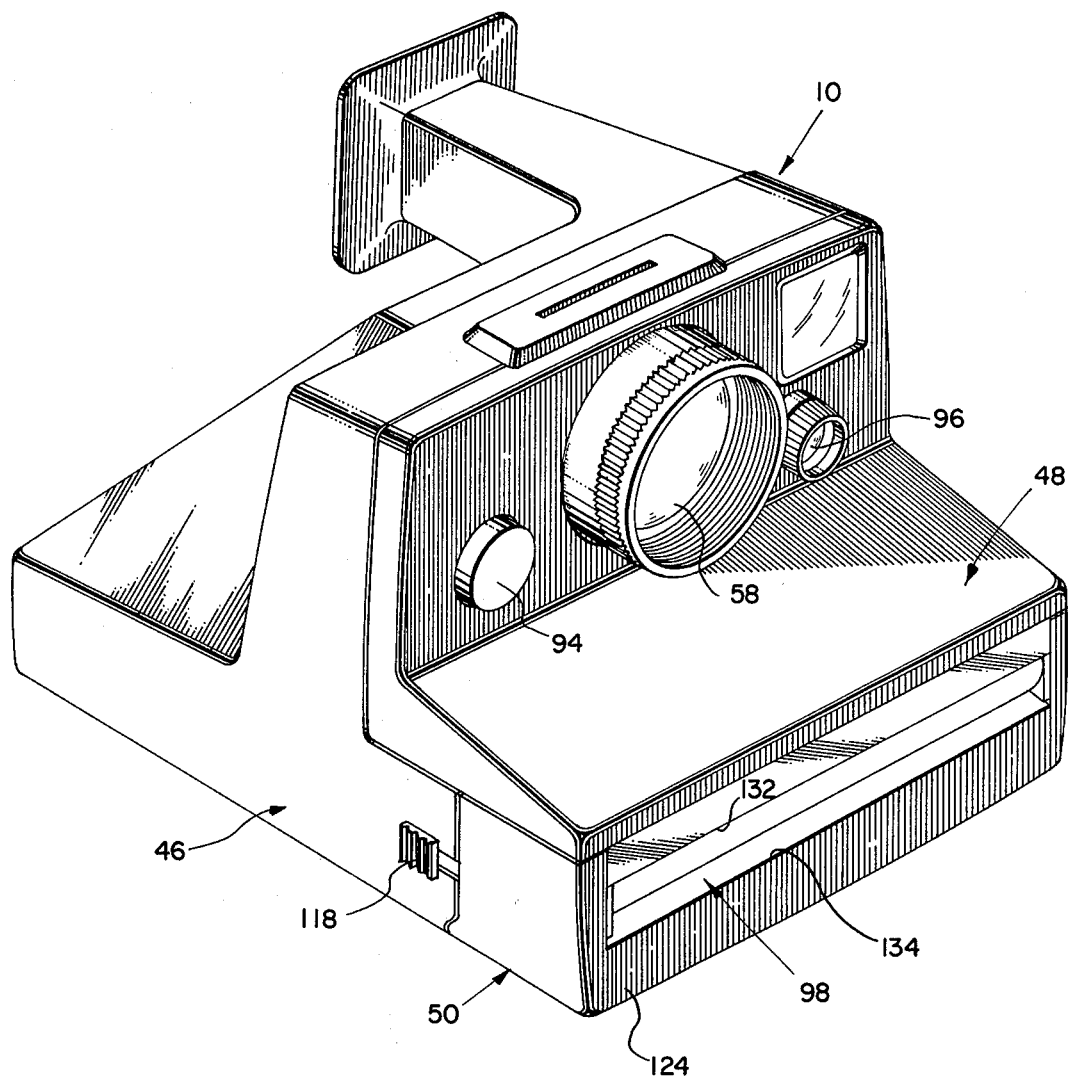
FIG. 1 is a perspective view of a compact, modular, nonfolding, self-developing camera embodying the present invention.

FIGS. 1 and 3 of the drawings show, respectively, a self-developing camera 10 which is adapted to receive a film container 12 holding a plurality of self-developing film units 14 arranged in stacked relation therein. Since the present invention is directed to camera structure for deflecting or bending a self-developing film unit as it emerges from a pair of pressure-applying members, the camera 10, film container 12, and self-developing film units 14 will be described only in sufficient detail to provide the necessary background for understanding the present invention.

Figure 7:
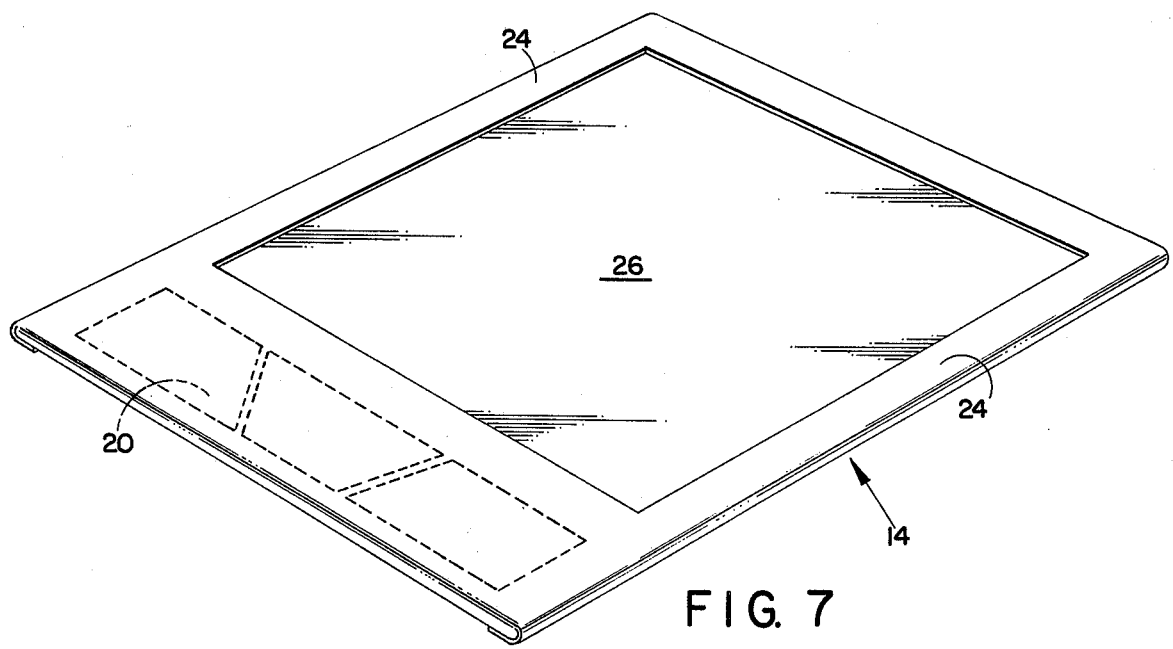
FIG. 7 is a perspective view of a self-developing film unit that is held in the film container shown in the FIG. 3.
Figure 8:
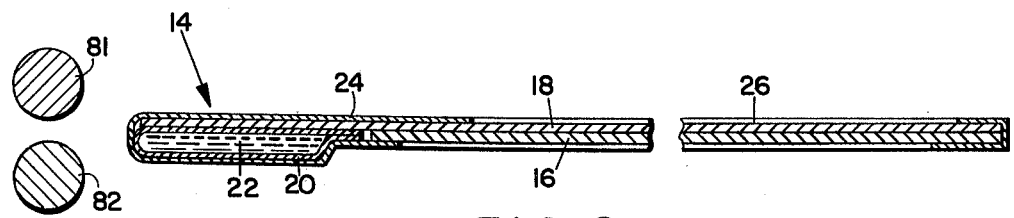
FIG. 8 is a diagrammatic sectional view of the film unit shown in FIG. 7.

The self-developing film unit 14 is of the integral "nonpeel apart" type and is best shown in FIGS. 7 and 8 of the drawings. Basically it is a multilayer structure or laminate which is diagramatically illustrated in FIG. 8 as including a bottom sheet-like element 16 and a superposed top sheet-like element 18. Attached to the leading end of element 18 is a rupturable container 20 holding a supply of fluid processing composition 22 therein.

In actuality, the multilayer structure includes an opaque bottom support sheet, a top transparent support sheet, and a plurality of layers sandwiched therebetween and including one or more photosensitive layers and one or more image-receiving layers. The laminate is bound along its lateral edges by a binding element 24 which also defines the bounds of a generally square or rectangular image-forming area 26 on the top transparent support sheet through which actinic radiation is transmitted to expose the photosensitive layer or layers. Subsequent to exposure, the film unit is progressively advanced between a pair of pressure-applying members or rollers which discharge the fluid 22 between a predetermined pair of adjacent layers within the multilayer structure. In FIG. 8 of the drawings, the fluid 22 is spread between elements 16 and 18 which are intended to show the interface between the predetermined pair of adjacent layers. In reality, element 18 includes the top transparent support sheet in certain chemical layers and element 16 includes the bottom support sheet and certain other chemical layers.

For a more detailed description of film unit 14, reference may be had to U.S. Pat. No. 3,415,644 issued to E. H. Land on Dec. 10, 1968.

Referring to FIG. 3, the film container 12 is generally a box-like structure, preferably of molded plastic construction, and includes a forward wall 28, a rear wall 30, and a peripheral section joining walls 28 and 30 and including a pair of lateral side walls 32, a trailing end wall 34 and a leading end wall 36. Forward wall 28 has a square or rectangular exposure aperture 38 therein which is coextensive with the image-forming area 26 of the film unit 14.

The film units 14 are arranged in stack relation within film container 12 such that the forwardmost film unit bears against the interior surface of forward wall 28 and is located in position for exposure through exposure aperture 38. Subsequent to exposure, the forwardmost film unit 14 is adapted to be advanced from film container 12 through an elongated film withdrawl slot 40 in forward wall 36. As will be described later, camera 10 includes a film advancing mechanism which is adapted to extend through an opening 42 near a trailing end corner of film container 12 for engaging and advancing the exposed forwardmost film unit through film withdrawl slot 40.

The stack of film units 14 is spring biased toward the interior surface of forward wall 28 by a spring platened (not shown) and, preferably, a flat battery 44 for powering the electrical equipment of camera 10 is provided within film container 12 in overlying relationship to rear wall 30 which has openings (not shown) therein providing access to the battery terminals.

Camera 10 is a compact, nonfolding, modular, battery operated, self-developing camera. As best shown in FIGS. 1 and 2, it includes a housing which is formed by three molded plastic housing sections 46, 48, and 50.

The major housing section 46 is a hollow open-ended structure which is adapted to receive a major modular unit 52 mounting most of the operative components and subassemblies of the camera on a mounting frame 54 thereof.

The mounting frame 54 is a hollow, open bottomed, cone-like structure of molded plastic construction which forms the camera exposure chamber 56 (see FIG. 4) and mounts; an optical system including an objective lens 58, a mirror 60 (on the interior surface of an inclined rear cone wall 62) and a viewfinder assembly 64; a camera drive, sequencing, film advance and film counting assembly 66 which includes an electrical motor 68, a gear train 70, a sequencing gear 72, a film advance device 74 and a film counter 76; and pressure-applying assembly 78 to which housing section 50 is attached and includes a mounting bracket 100 and a pair of juxtaposed pressure-applying members or rollers 81 and 82 and a roller drive gear 84 on the end of roller 81.

Figure 5:
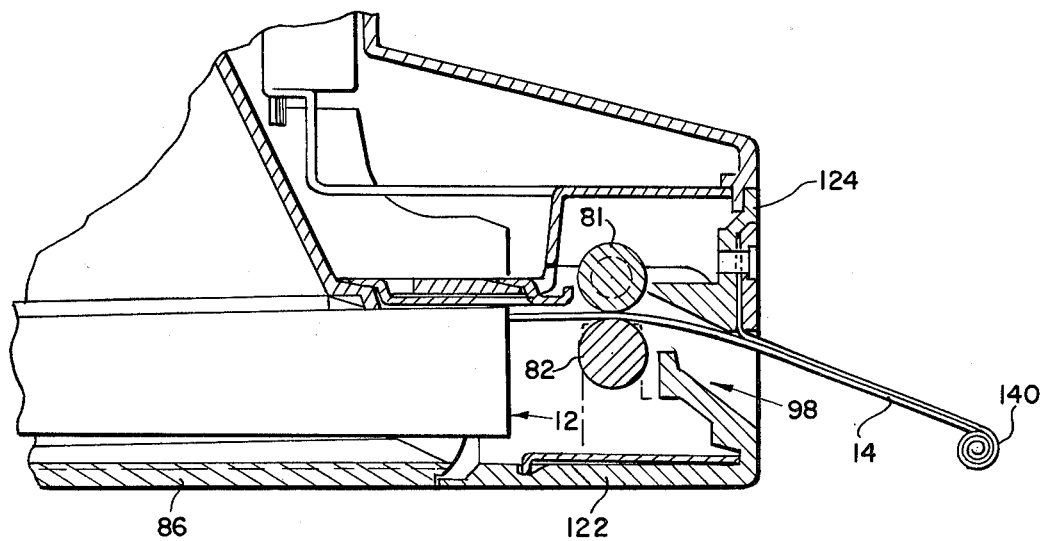
FIG. 5 is a side elevational view, partly in section, of a portion of the camera shown in FIG. 5 illustrating the path of travel of a film unit that emerges from a pair of pressure-applying members and advances through an exit opening in the front of the camera.

When the camera 10 is assembled, the cone-like frame 54 cooperates with the bottom wall 86 of housing section 46 to define an open ended chamber 88 in the base of housing section 46 for receiving film container 12 in the position shown in FIG. 5 with the film container exposure aperture 38 facing the open bottom of cone-like frame 54. As will be described later, roller mounting bracket 80 is pivotally mounted on frame 54 so that the roller assembly 78 and housing section 50 pivot downwardly to provide access to the open end of receiving chamber 88 for inserting and withdrawing film container 12. A pair of battery contacts 90, mounted on bottom wall 86, connect battery 44 to the camera's electrical system.

In operation, the user views and frames the scene to be photographed through the direct viewing viewfinder assembly 64 (enclosed by a viewfinder housing 92 integrally molded with housing section 46) and focuses lens 58. A cycle of operation is initiated by depressing a camera start button 94 on housing section 48 which causes motor 68 to be energized thereby driving gear train 70 which in turn drives sequencing gear 72 and roller gear 84. Sequencing gear 72 operates a mechanism (not shown) which unlatches a normally closed electronic shutter and latches power onto an electronic logic and power circuit (neither of which is shown). This circuit controls an automatic exposure control circuit (not shown) which includes a photocell to which scene light is directed by a window 96 on housing section 48. When power is latched on, motor 68 is deenergized.

Image-bearing light from the scene is transmitted by lens 58 to cross chamber 56 where it impinges upon the mirror 60. From mirror 60, the light is reflected downwardly through the exposure aperture 38 in film container 12 to expose the forwardmost film unit 14. Using well known light integrating techniques, the exposure control circuit provides an exposure termination signal to the logic circuit which in turn provides appropriate signals to cause the electronic shutter to close and motor 68 to be reenergized.

Sequencing gear 72 drives the film advance device 74 forwardly along a linear path and a hook-like member (not shown) at the trailing end thereof extending through film container access opening 42 engages the trailing end of the exposed forwardmost film unit 14 and advances it forwardly through film withdrawal slot 36 into the bite between rollers 81 and 82. Roller 81 is driven in a direction to cause the film unit to be advanced therebetween for progressively applying a compressive pressure along the length of the film unit 14. As will be described hereinafter the film unit 14 exits from camera 10 through a film exit opening 98 in housing section 50. At the termination of the processing cycle, the operating mechanicisms are reset for the next cycle of operation and the cycle is automatically terminated.

For a detailed description of the previously described structure and operation of camera 10, reference may be had to copending applications, Ser. Nos. 554,777, 554,778, 554,779, and 554,769, all of which have been filed on even date herewith and are assigned to the same assignee as the present invention.

Figure 6:
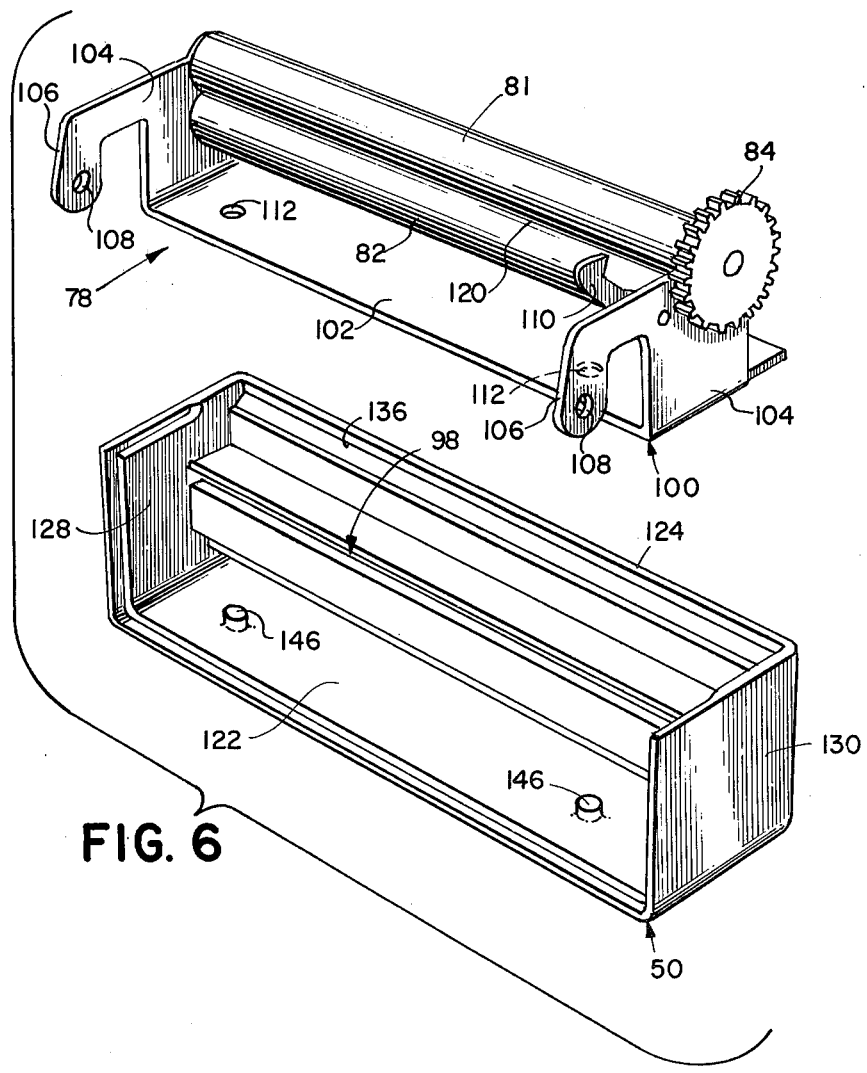
FIG. 6 is a perspective view, shown in exploded fashion, of a molded plastic housing section embodying the present invention and a pressure-applying roller assembly that is adapted to cooperate with the housing section.

As best shown in FIG. 6, the roller assembly 78 comprises the roller mounting bracket 100 and the juxtaposed pair of pressure applying members or rollers 81 and 82 mounted thereon.

Roller mounting bracket 100 is preferably of stamped metal construction and includes a generally planar, horizontal bottom member 102, and a pair of integrally formed lateral side members 104 upstanding vertically at the lateral ends of bottom member 102. Integrally formed with side members 104 and extending rearwardly therefrom are a pair of arcuate mounting flanges 106 having mounting holes 108 therein. Other structural features of bracket include an upstanding latch member 110 integrally formed with the right hand mounting flange 106 (as viewed in FIG. 6) and a pair of locating or positioning holes 112 in horizontal member 102 for locating or positioning housing section 50 with respect to bracket 100.

The pressure-applying members or rollers 81 and 82 are rotatably mounted transversely of the side members 104 with their respective lateral ends mounted in suitable bearings (not shown) in lateral side walls 104. The roller drive gear 84 is mounted on the right hand end of roller 81.

As best shown in FIG. 2 the component mounting frame 54 includes a pair of laterally spaced depending legs 114 having outwardly extended pins 116 thereon which are adapted to extend through the openings 108 on bracket mounting flanges 106 thereby pivotally mounting the roller assembly on the leading end of frame 54 for pivotal movement between its positions blocking and unblocking the open end of camera receiving chamber 88. When the roller assembly is in its closed position, the latch member 110 cooperates with a slidable latch member 118 or the right hand side of housing section 46 to maintain the roller assembly in the closed position wherein the entrance side 120 (the horizontal bite between rollers 81 and 82) of the pressure-applying members is adjacent the film withdrawal slot 40 of film container 12 and the leading end of the forwardmost film unit 14 located therein.

As noted earlier, housing section 50 is of molded plastic construction and includes integrally molded and substantially mutually perpendicular wall portions 122, 124, 126, and 128. Wall portion 122 is adapted to underlie the horizontal member 102 of bracket 100 and forms a horizontal extension of the bottom wall 86 of housing section 46 when the roller assembly is located in the closed position. The forward wall portion 124 includes the film exit slot 98 integrally molded therein and serves as a leading end wall of the camera housing. The lateral sides of housing section 50 are formed by lateral side wall portions 128 and 130.

The integrally molded film exit slot 98 in wall portion 124 is transversely disposed therein and is just slightly wider than the lateral dimension of the film unit 14. On the exterior surfaces of wall portion 124 the vertical dimension of the slot 98 is established by upper and lower horizontal edges 132 and 134 respectively.

Figure 4:
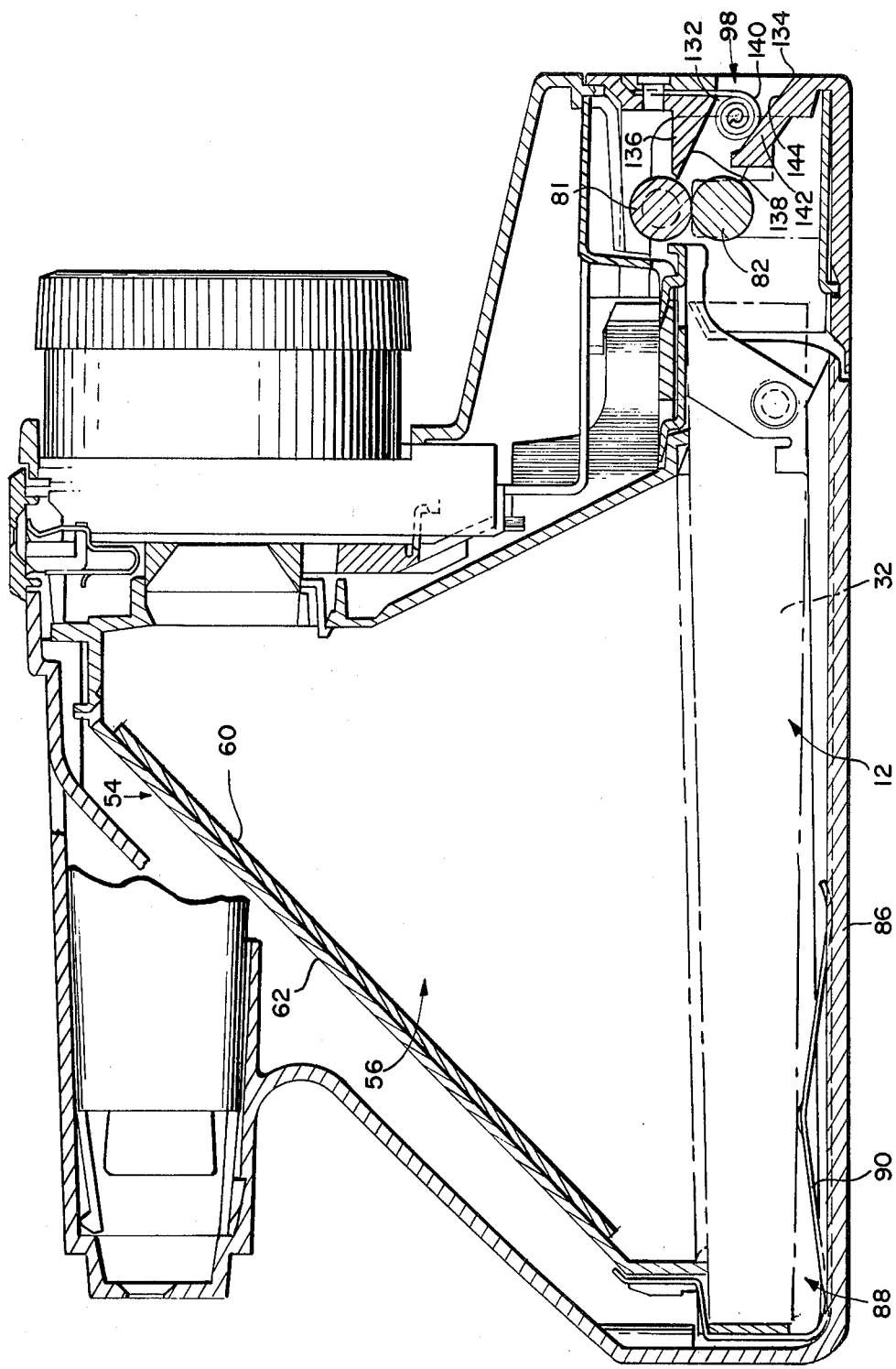
FIG. 4 is a side elevational view, partly in section, of the camera shown in FIG. 1.

As best shown in FIG. 4, housing section 50 further includes camming member 136 integrally molded with wall portion 124 and extending rearwardly therefrom for defining a general planar transverse inclined camming surface 138 which is preferably coextensive with the width of slot 98 and extends rearwardly from the upper edge 132 of slot 98 and upwardly therefrom towards the exit side of the rollers 81 and 82 (opposite entrance side 120). As will be described later, camming surface 138 serves as means for deflecting a film unit as it emerges from rollers 81 and 82 and for guiding it to exit slot 98.

The previously mentioned copending applications Ser. Nos. 466,371 and 466,414 disclose an extensible and retractible light shield for shielding that portion of the film unit 14 that extends exteriorly of exit slot 98 before the trailing end of the film unit 14 passes between rollers. Although the processing fluid 22 includes an opacification system which allows the film unit to be ejected into the ambient light without causing further exposure of the photosensitive material within the film unit, it is desirable to light shield the exterior portion of the film unit to prevent "light-piping" or transmission of light lengthwise within the transparent outer sheet which may travel rearwardly to a point aft of the rollers 81 and 82 and expose or fog that portion of the film unit that has not yet been protected by the processing fluid. This concept is fully explained in the aforementioned U.S. Pat. No. 3,810,211.

The light shield is preferably in the form of a coil 140 of resilient, light opaque material, such as treated Mylar, which has its exterior end attached to wall portion 124 above upper edge 132 of slot 98. The coil 140 is normally retracted and is positioned in alignment with and in substantially light blocking relation to slot 98 (see FIG. 4).

In order to accurately locate coil 140 in its proper retracted position, housing section 50 further includes a rearwardly extending member 142 integrally molded with wall portion 124 that defines an upwardly inclined surface 144 on the opposite side of slot 98 from camming surface 138 extending rearwardly and upwardly from lower edge 134 of slot 98 toward the exit side of the rollers. Surface 144 serves as a locating stop against which the retracted coil 140 bears and is preferably coextensive with the width of slot 98 so as to cooperate with the retracted coil or shield 140 to form a light seal for film exit slot 98. This seal is necessary to prevent light from being transmitted through slot 98 and the bite of the rollers which may cause fogging of the forwardmost film unit 14 in container 12.

Housing section 50 further included integrally molded means for accurately positioning housing section 50 and especially exit slot 98 and camming surface 144 with respect to the bite between pressure applying rollers 81 and 82. As best shown in FIG. 6, the horizontal wall portion 122 of housing section 50 has integrally molded therewith a pair of projections or pins 146 which extend upwardly and vertically from the interior surface thereof. The pins 146 extend through the locating holes 112 in mounting bracket member 102 and the interior surface of wall portion 122 bears on the underside surface of member 102 to stabilize and accurately position housing section 50 with respect to rollers 50. So positioned, housing section 50 is attached to bracket 100 by any suitable means such as screws, rivets, etc. (not shown). While the positioning structure (pins 146 and the interior surface of wall portion 122) have been shown to be integrally formed with wall portion 122, it is within the scope of the present invention to provide cooperating positioning and locating structure on the wall portions 128 and 130 and the bracket lateral members 104.

With roller mounting bracket 100 and housing section 50 located in the closed position (see FIGS. 4 and 5) the leading end wall portion 124 is disposed forwardly of the exit side of the rollers 81 and 82, a distance less than the given length of a self-developing film unit.

As was noted earlier, the film unit 14 has an inherent stiffness thereto since the outer support sheets are preferably formed of a material such as Mylar or conventional film base material. As the film unit is advanced through the rollers 81 and 82 it tends to follow a natural or normal emerging path of travel, defined by the inherent stiffness, that tends to be substantially parallel to the horizontal wall portion 122 of housing section 50.

When housing section 50 is accurately positioned on bracket 100, the film exit slot 98 is displaced from (below) the normal emerging path of travel. However, the rearwardly extending and upwardly inclined camming surface 138 intersects with and extends through the emerging path of travel.

In operation, the camera cycle is initiated, the forwardmost film unit is exposed and the exposed film unit is advanced leading end first, into the bite of rollers 81 and 82 from the film entrance side 120 thereof. The driven top roller 81 cause the film unit to be advanced therebetween and the emerging leading end engages the inclined camming surface 138 thereby deflecting the film unit downwardly and guiding it through exit slot 98. This deflection induces a gentle bend having a relatively large radius of curvature in the film unit, forwardly of rollers 81 and 82, which as previously mentioned provides a beneficial influence on the uniformity of the distribution of the processing fluid that is spread between the predetermined layers of the film unit 14.

As the leading end of the film unit proceeds towards exit 98, it engages the coil 140 and drives or extends it forwardly such that it progressively unfurls in overlying relation to the top transparent outer support sheet of the film unit. The length of coil 140 is shorter than the length of film unit 14 that extends out of slot 98 before the trailing end of the film unit 14 passes between rollers 81 and 82. Just before the film unit is disengaged from rollers 81 and 82, the free end of the coil becomes disengaged from the leading end of the film unit 14 and automatically snaps back to its retracted position. The film unit is releasably retained on housing section 50 by film retainers (not shown) until it is removed at the convenience of the user.

In summary, a self-developing camera has been provided which includes a novel housing section of molded plastic construction having integrally molded therewith a film exit slot, a film deflecting or bending member and means cooperating with a roller mounting bracket for accurately positioning the housing section with respect to a pair of pressure applying rollers. In a preferred embodiment, the housing section also includes an integrally molded member serving as a stop for an extensible and retractable light shield and cooperating with the light shield to form a light seal for the exit slot.

Since certain changes may be made in the above camera without departing from the scope of the invention herein involved, it is intended that all matter contained in the above description or shown in the accompanying drawings shall be interpreted as illustrative and not in a limiting sense.

What is claimed is:

1. A self-developing camera for use with a self-developing film unit having a given length, between leading and trailing ends thereof, and an inherent stiffness and including an integral supply of fluid processing composition that is adapted to be distributed within the film unit in response to applying a compressive pressure progressively along the length of the film unit from the leading end towards the trailing end; said camera comprising:
    a camera housing including a housing section of molded plastic construction having integrally molded first and second wall portions thereof disposed at substantially right angles to each other;
    means for locating such a film unit within said camera housing in position for exposure;
    means for exposing the film unit at said exposure position;
    a pair of pressure applying members having a film entrance side and a film exit side, opposite said entrance side, and between which the exposed film unit is adapted to be advanced for applying a compressive pressure progressively along the length of the film unit; and
    a mounting bracket for mounting said pair of pressure applying members in a predetermined relationship with said exposure position so that an exposed film unit advances between said pair of pressure-applying members from said entrance side, leading end first, and emerges from said exit side following a normal emerging path of travel defined by the inherent stiffness of the film unit;
    said housing section further including;
    positioning structure integrally molded with said first wall portion and cooperating with said mounting bracket for positioning said housing section in a predetermined operative relationship with said pair of pressure-applying members wherein said second wall portion of said housing section is disposed forwardly of said exit side of said pair of pressure-applying members and is spaced from said exit side a distance less than the given length of the film unit;
    structure integrally molded with said second wall portion and defining therein a film exit slot through which a film unit emerging from said exit side of said pair of pressure-applying members is adapted to be advanced from said housing, said exit slot being disposed in said second wall portion at a location that is displaced from the normal emerging path of travel of a film unit; and
    a camming member integrally molded with said second wall portion and including a camming surface extending toward said exit side of said pair of pressure-applying members and intersecting the normal emerging path of travel of the film unit for deflecting the film unit from its normal path of travel and guiding it to said displaced film exit slot.

2. A self-developing camera as defined in claim 1 wherein said camming surface is at least as wide as the lateral dimensions of the film unit when measured transverse to the direction of film advancement through said exit slot.

3. A self-developing camera as defined in claim 1 wherein said camming surface is inclined with respect to said second wall portion and extends from one edge of said film exit slot rearwardly towards said exit side of said pair of pressure-applying members.

4. A self-developing camera for use with a self-developing film unit having a given length, between leading and trailing ends thereof, and an inherent stiffness and including an integral supply of fluid processing composition that is adapted to be distributed within the film unit in response to applying a compressive pressure progressively along the length of the film unit from the leading end towards the trailing end; said camera comprising:
    a camera housing including a housing section of molded plastic construction having integrally molded first and second wall portions thereof disposed at substantially right angles to each other;
    means for locating such a film unit within said camera housing in position for exposure;
    means for exposing the film unit at said exposure position;
    a pair of pressure-applying members having a film entrance side and a film exit side, opposite said entrance side, and between which the exposed film unit is adapted to be advanced for applying a compressive pressure progressively along the length of the film unit;
    a mounting bracket for mounting said pair of pressure-applying members in a predetermined relationship with said exposure position so that an exposed film unit advances between said pair of pressure-applying members from said entrance side, leading end first, and emerges from said exit side following a normal emerging path of travel defined by the inherent stiffness of the film unit; and
    an extensible and retractable light shield mounted on said housing section in alignment with said film exit slot for light shielding that portion of the film unit extending through said exit slot and exteriorly of said housing before the trailing of the film unit passes between said pair of pressure-applying members, said light shield normally being in a retracted condition in at least partial blocking relationship with said exit slot and being extensible therefrom as a film unit is advanced through said exit slot;

said housing section further including;

positioning structure integrally molded with said first wall portion and cooperating with said mounting bracket for positioning said housing section in a predetermined operative relationship with said pair of pressure-applying members wherein said second wall portion of said housing section is disposed forwardly of said exit side of said pair of pressure-applying members and is spaced from said exit side a distance less than the given length of the film unit;

structure integrally molded with said second wall portion and defining therein a film exit slot through which a film unit emerging from said exit side of said pair of pressure-applying members is adapted to be advanced from said housing, said exit slot being disposed in said second wall portion at a location that is displaced from the normal emerging path of travel of a film unit;

a camming member integrally molded with said second wall portion and including a camming surface extending toward said exit side of said pair of pressure-applying members and intersecting the normal emerging path of travel of the film unit for deflecting the film unit from its normal path of travel and guiding it to said displaced film exit slot; and a member integrally molded with said second wall portion and extending rearwardly therefrom toward said exit side of said pressure-applying member on the opposite side of said exit slot from said camming surface for defining a surface against which said retracted light shield bears to define the retracted position of said light shield relative to said exit slot, and for cooperating with said retracted light shield to form a light seal for said exit slot.

* * * * *